Aug. 11, 1953  T. B. DALTON  2,648,183
WRAPPER FEEDING MECHANISM
Filed Oct. 17, 1949  7 Sheets-Sheet 5
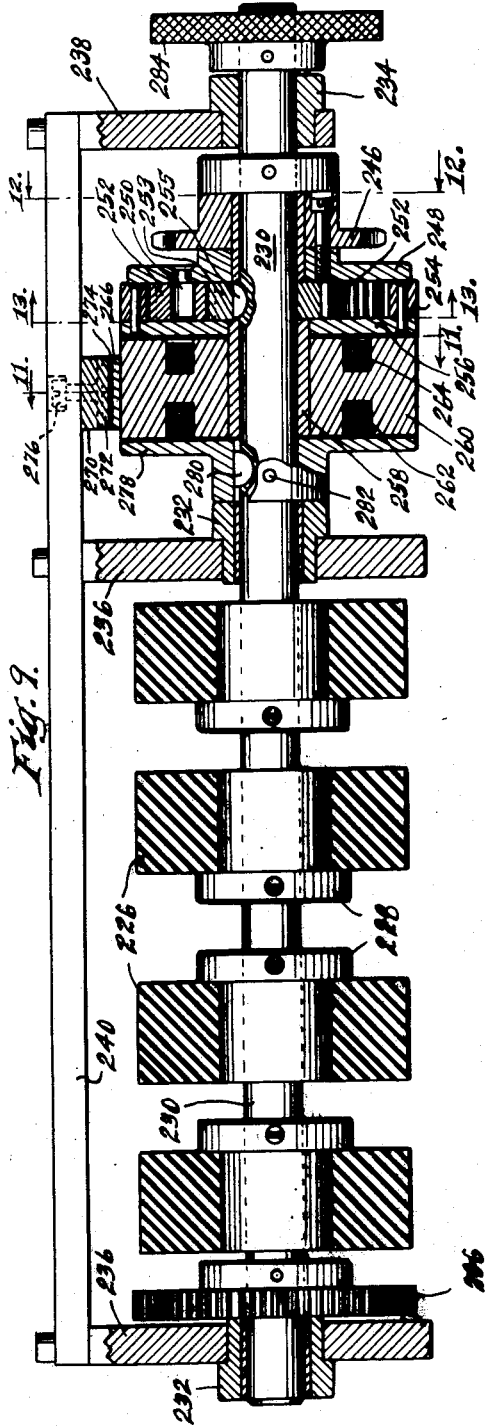
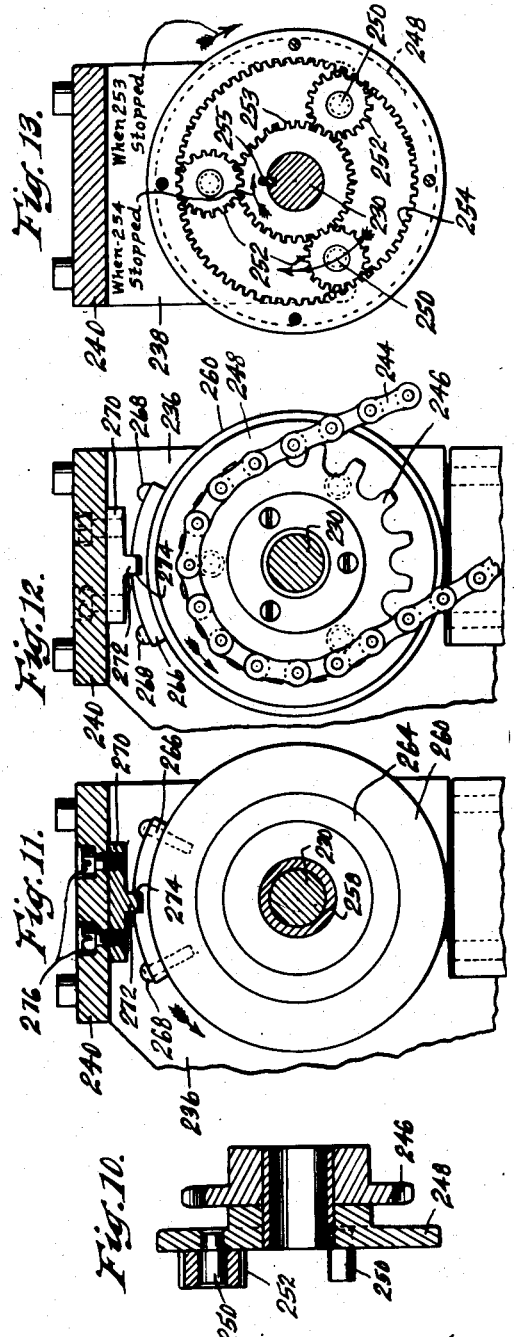
Inventor:
Thomas B. Dalton
By Bair & Freeman
Attys

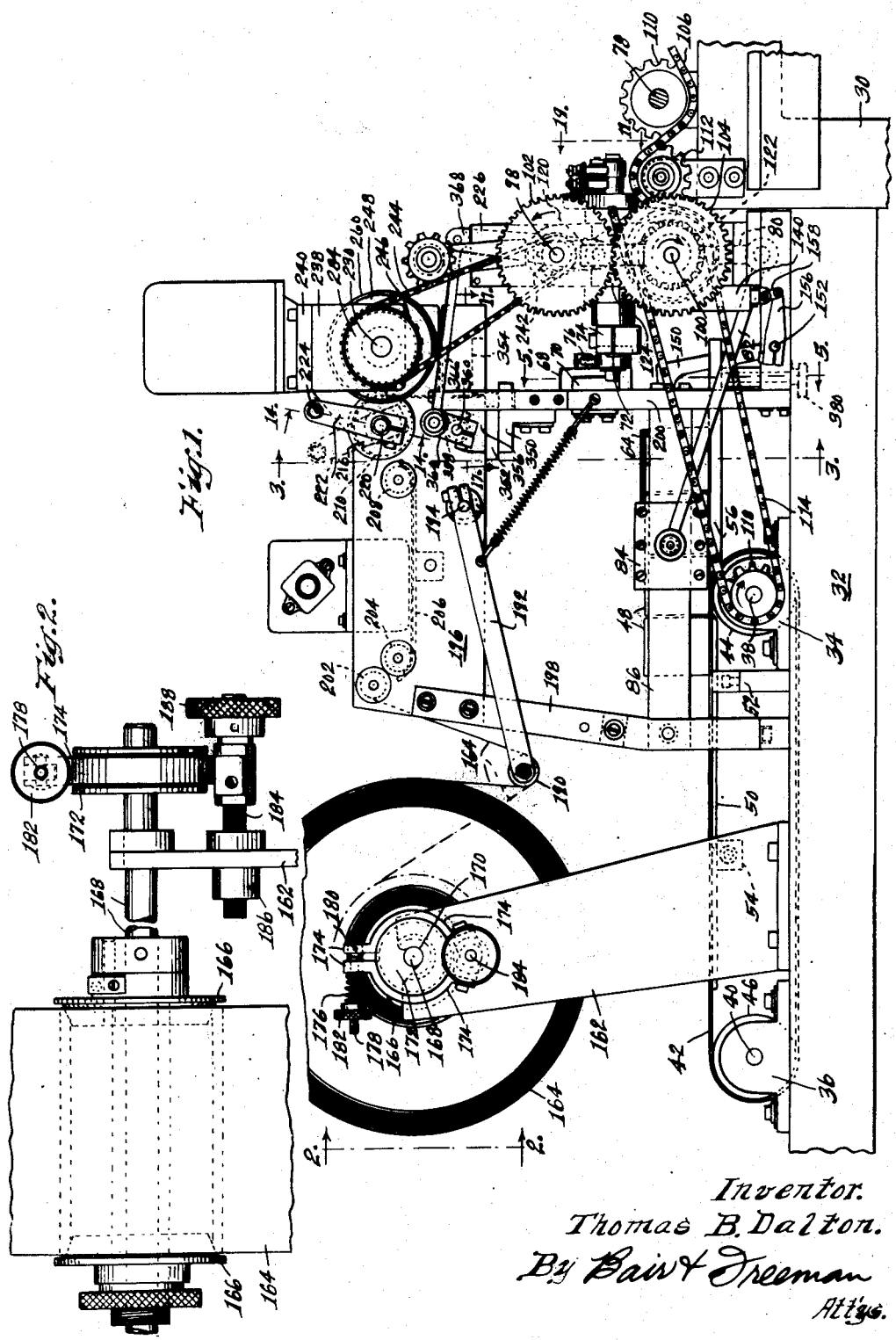

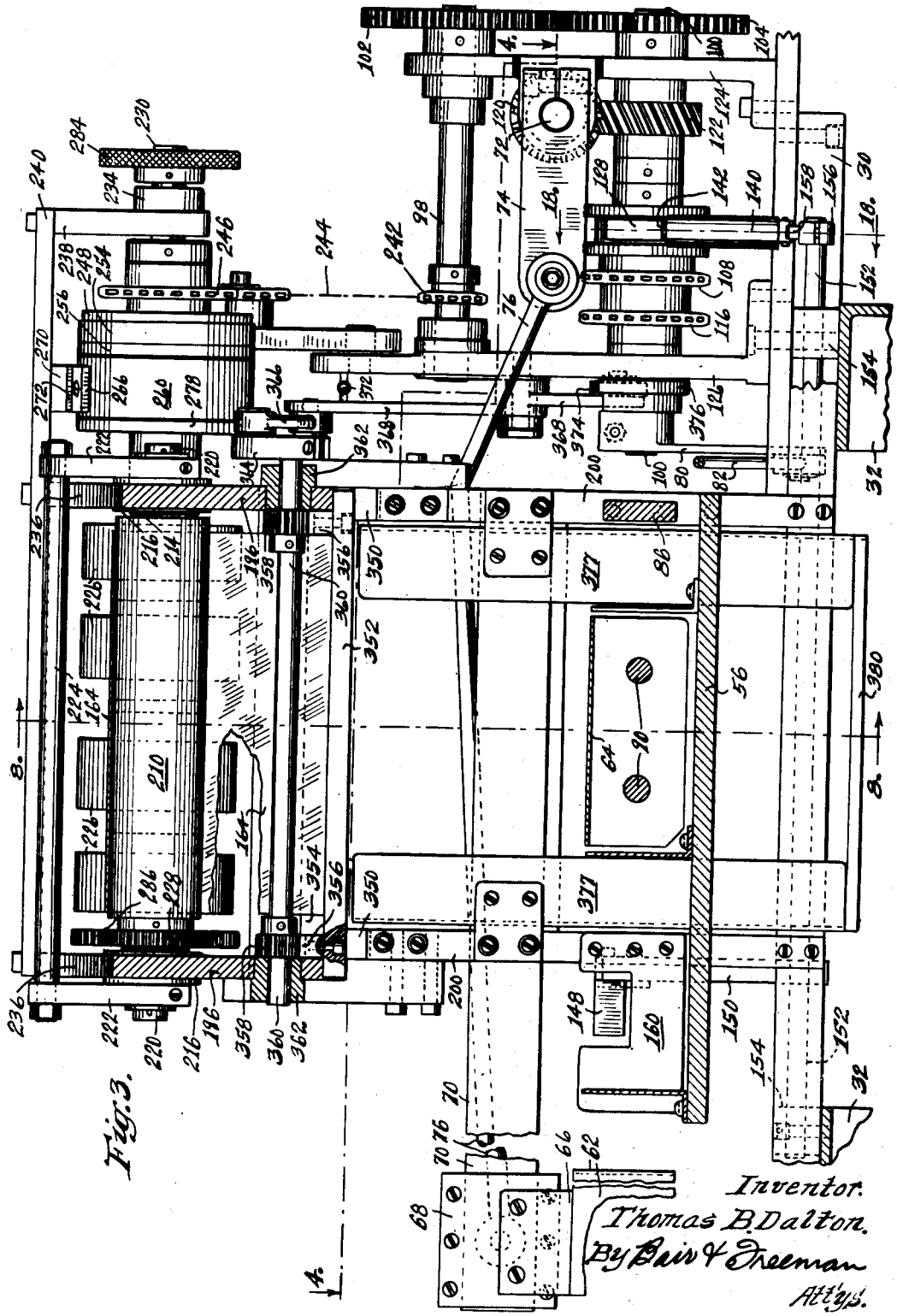

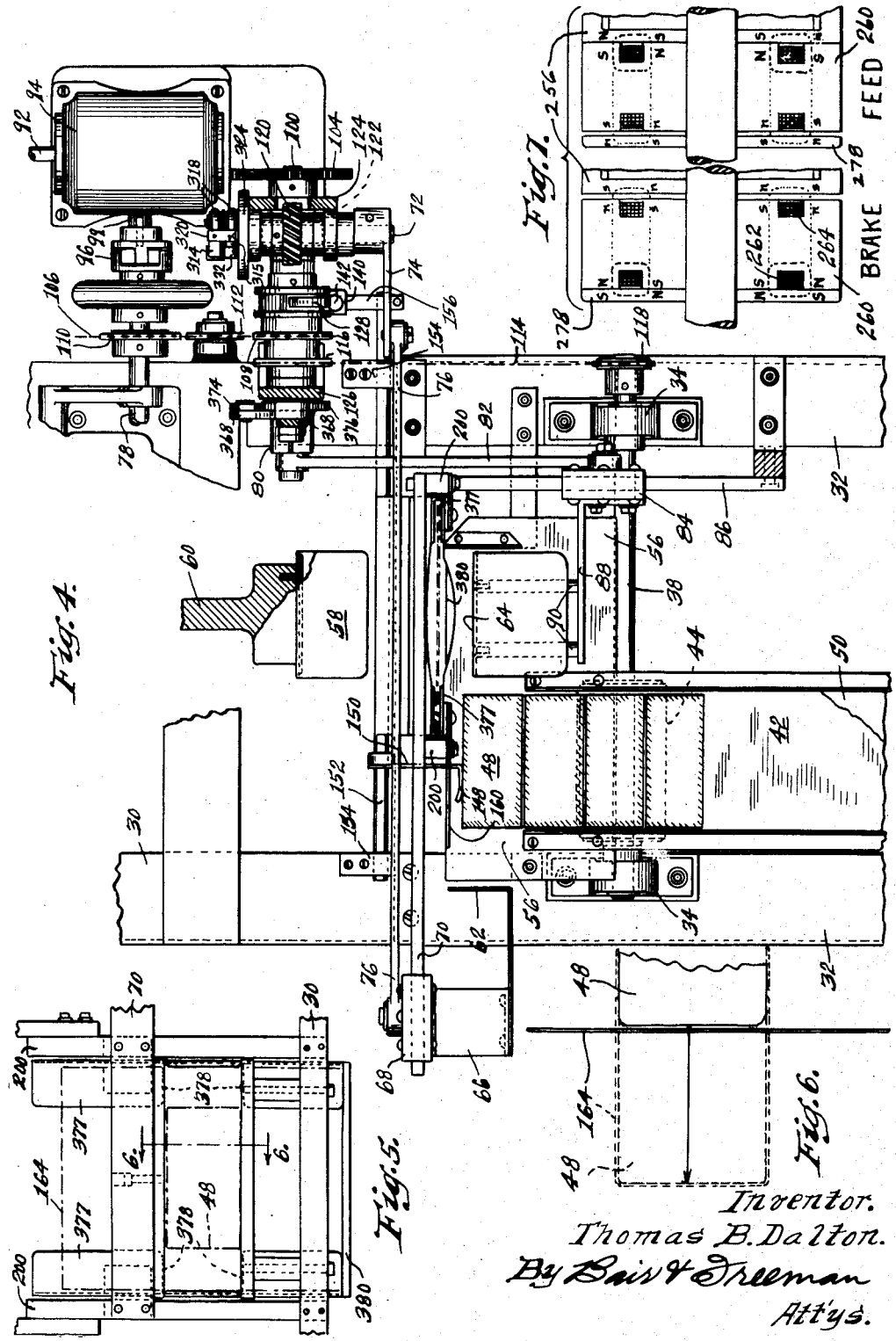

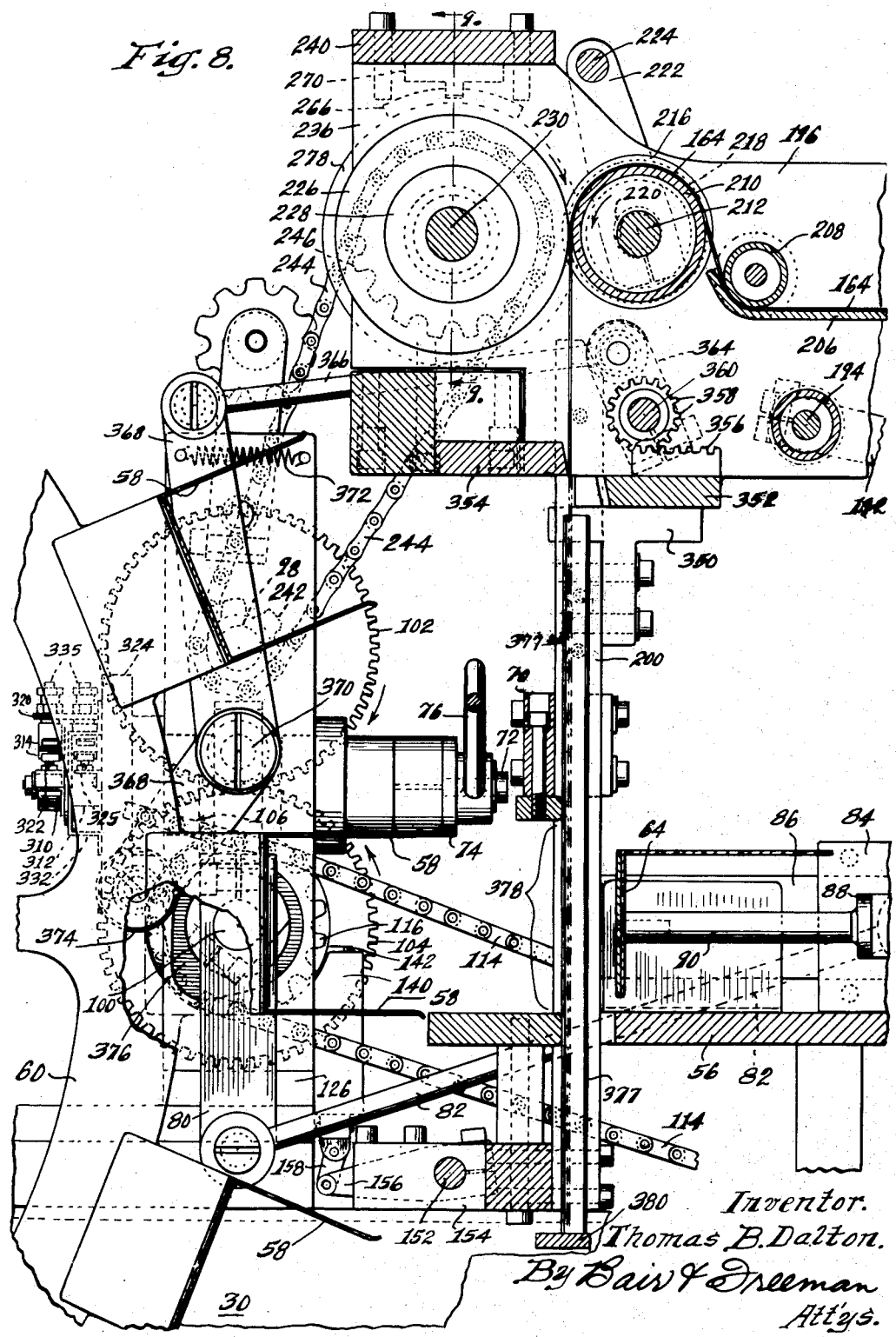

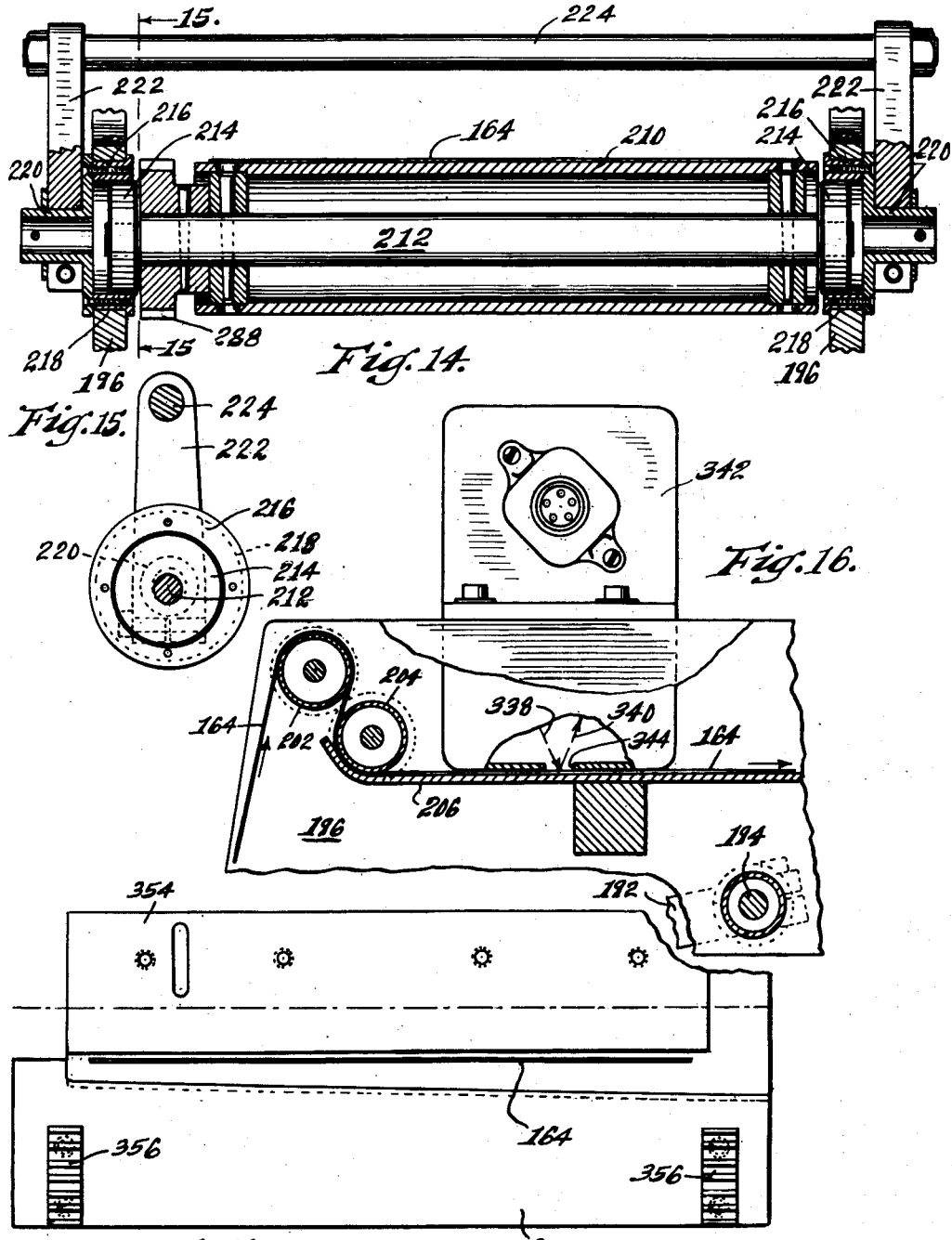

Aug. 11, 1953  T. B. DALTON  2,648,183
WRAPPER FEEDING MECHANISM
Filed Oct. 17, 1949  7 Sheets-Sheet 7
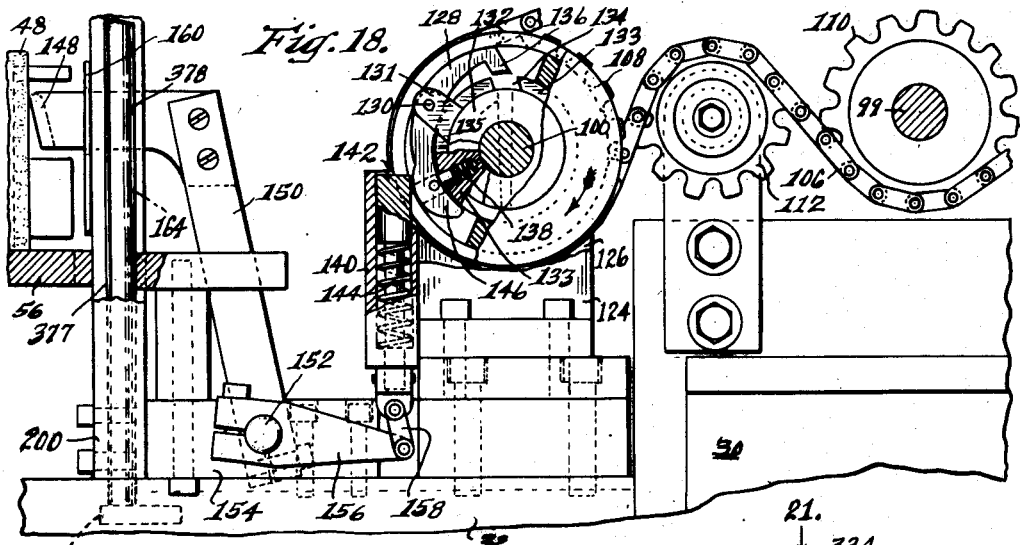
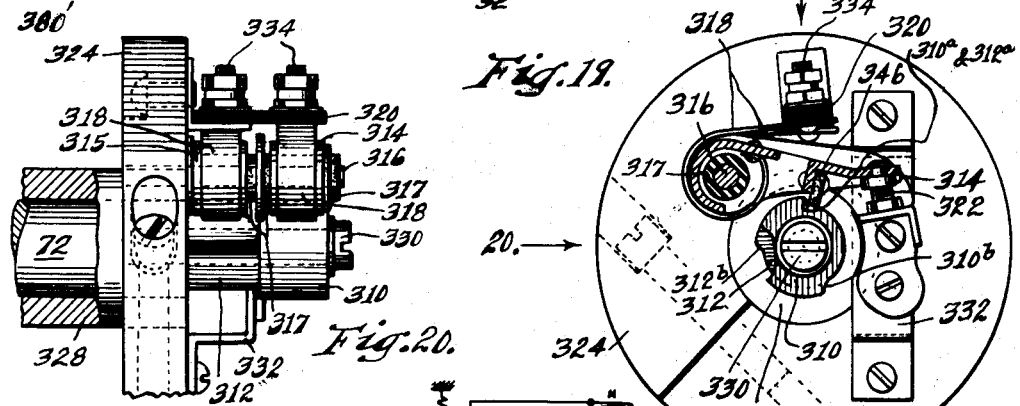
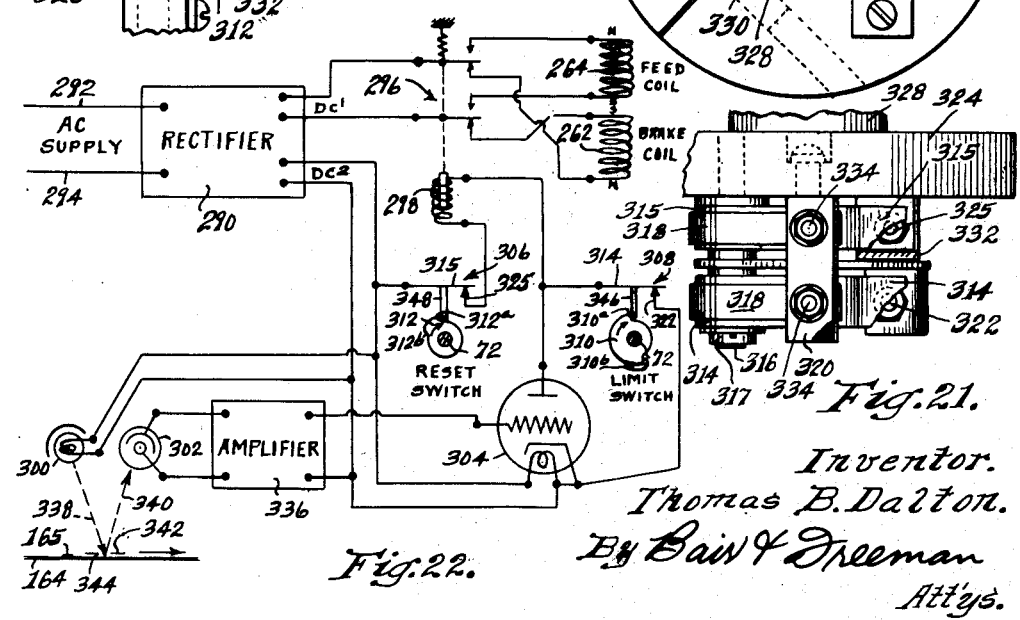
Inventor.
Thomas B. Dalton.
By Bair & Freeman
Att'ys.

Patented Aug. 11, 1953

2,648,183

UNITED STATES PATENT OFFICE 2,648,183

WRAPPER FEEDING MECHANISM

Thomas B. Dalton, Montague, Mich., assignor, by mesne assignments, to Valley Research Corporation, Montague, Mich., a corporation of Michigan Application October 17, 1949, Serial No. 121,857

10 Claims. (Cl. 53—155)

This invention relates to a wrapper feeding mechanism which is particularly designed for properly feeding wrappers to a wrapping machine and automatically cutting predetermined lengths of wrappers from a continuous strip of wrapping material (which may be supplied from a roll) as determined by spaced index markings on the strip, the mechanism herein disclosed being adaptable for wrapping machines of the type shown in my copending application, Serial No. 29,435, filed May 27, 1948.

One object of the invention is to provide a light sensitive means to scan the strip of wrapping material as it is fed to a wrapping machine and operate a means to stop the wrapper feeding mechanism upon the light sensitive means responding to an index mark on the wrapping material whereby an individual wrapper of exactly the right length is fed and cut off each cycle of the machine with cut offs occurring at a predetermined point with relation to any advertising, trade name, or other design on each wrapper.

Another object is to provide a novel electromagnetic clutching and braking means for starting and stopping the rotation of a wrapper feed roller and an arrangement of switches and light sensitive means such as a photoelectric tube and a thyratron tube combination for controlling the electromagnetic clutching and braking means.

Still another object is to provide a brake and clutch arrangement in which a core member floats on the wrapper feed roller shaft and is provided with a pair of coils, one to produce magnetism for a feeding operation and the other to produce magnetism for a braking operation.

A further object is to provide adjacent the core member a brake disc of ferrous material secured to the shaft for the wrapper feed rollers and a feed disc thereadjacent which is operably connected with a power means so that when one coil is energized braking occurs, and when the other coil is energized the transmission of motion from the power means to the wrapper feed roller results.

Still a further object is to provide the feed and brake coils operable to energize the core member in magnetically opposite directions so that the energization of one coil cancels the residual magnetism resulting from prior energization of the other coil, thus insuring uninterrupted and positive feeding and braking operations which occur promptly upon a change from a braking to a feeding condition or vice versa.

An additional object is to provide a relay arrangement for controlling alternate energization of the feed and brake coils and a switching arrangement including a reset switch and a limit switch cooperating with the photoelectric tube and the thyratron tube for effecting a positive energization of the feed coil independent of the photoelectric tube during the first part of the revolution of the wrapper feed roller and a positive braking action during the last part of the cycle, the photoelectric tube being operable between these two parts to de-energize the feed coil and energize the brake coil if an index mark on the wrapper passes the photoelectric tube before said last part of the cycle commences, a cut-off knife for the individual wrappers being operated during said last part of the cycle.

Another additional object is to provide an arrangement of a photo-electric tube operable to cause a thyratron tube energized by direct current to start conducting upon the photo-electric tube observing an index mark on the wrapper, the plate side of the thyratron tube being in series with a reset switch and a relay for operating the relay when the reset switch is closed and the thyratron tube is conducting, a limit switch being arranged to shunt the plate side of the thyratron tube to provide positive brake action in case the thyratron tube does not do so and the reset switch being operable to stop conduction of the thyratron tube whereby it is ready for operating again when the reset switch closes.

A further additional object is to provide control means for the feed and brake coils comprising a relay normally energizing the feed coil and capable of energizing the brake coil when a reset switch is closed and a thyratron tube in series therewith is rendered conductive by a photoelectric cell and/or a limit switch shunting the thyratron tube is closed during the cycling of the wrapping machine.

With these and other objects in view, my invention consists in the construction, arrangement and combination of the various parts of my wrapper feeding mechanism, whereby the objects contemplated are attained, as hereinafter more fully set forth, pointed out in my claims and illustrated in the accompanying drawings, wherein:

Figure 1 is a side elevation of a wrapper feeding mechanism embodying my present invention.

Figure 2 is an end view of the portions thereof adjacent the indicating line 2—2 of Figure 1.

Figure 3 is an enlarged sectional view on the line 3—3 of Figure 1.

Figure 4 is a plan view of part of the mechanism reduced to the scale of Figure 1 and with a portion thereof on the line 4—4 of Figure 3 shown in section, some of the parts omitted for clarity.

Figure 5 is a further reduced elevation on the line 5—5 of Figure 1 showing particularly the side edge guides for the wrapper.

Figure 6 is an enlarged sectional view on the line 6—6 of Figure 5 showing one pound of product such as butter or oleomargarine being wrapped, the product and the wrapper being shown in initial position by solid lines and in a partially wrapped position by dotted lines.

Figure 7 is a diagrammatic view of an electromagnetic portion of my wrapper feeding clutch and braking mechanism illustrating two different conditions of operation, to wit, a braking operation and a feeding operation.

Figure 8 is an enlarged sectional view on the line 8—8 of Figure 3.

Figure 9 is an enlarged sectional view on the line 9—9 of Figure 8.

Figure 10 is a sectional view showing a sprocket and planetary gear unit per se which is illustrated in the assembly of Figure 9.

Figures 11, 12 and 13 are sectional views on the lines 11—11, 12—12, and 13—13 respectively of Figure 9.

Figure 14 is an enlarged sectional view on the line 14—14 of Figure 1.

Figure 15 is a sectional view on the line 15—15 of Figure 14 to show the details of a secondary feed roll adjusting means.

Figure 16 is an enlarged sectional view of a portion of Figure 1.

Figure 17 is a plan view of the cutting knives for the wrappers as taken on the line 17—17 of Figure 1.

Figure 18 is a partial side elevation of Figure 1 with portions thereof taken on the section line 18—18 of Figure 3.

Figure 19 is an end view of a switch mechanism adjacent the indicator line 19—19 of Figure 1.

Figure 20 is a side elevation thereof looking in the direction of the arrow 20 adjacent Figure 19.

Figure 21 is a plan view thereof looking in the direction of the arrow 21 adjacent Figure 19; and Figure 22 is an electro-diagrammatic view showing the essentials of the feed and brake coil circuits and the photo-electric tube circuit used in conjunction therewith.

On the accompanying drawings I have used the reference numeral 30 to indicate a portion of the main frame of a wrapping machine such as shown in my copending application at 10, and 32 is an extension of the frame 30 shown at 48 in said application.

Bearings 34 and 36 are mounted on the frame extensions 32 for journalling shafts 38 and 40. A product feed belt 42 extends around rollers 44 and 46 on the shafts 38 and 40 respectively and is adapted to receive products such as one pound quantities of butter or oleomargarine indicated at 48. A supporting plate 50 is provided under the belt 42 and is suitably supported by brackets 52 and 54. The product 48 is transferred onto a stationary plate 56 and propelled forwardly along the plate by additional products during normal operation of the wrapping machine.

Referring to Figure 4, the product 48 is adapted to be slid laterally to the right on the plate 56 for alignment with one of the channel-shaped pockets 58 of a rotary conveyor wheel 60 and then pushed forwardly (upwardly in said figure) into the pocket as will hereinafter be disclosed.

The mechanism for accomplishing the movement of the product 48 as just described, includes a laterally operating ram plate 62 and a fore-and-aft operating ram plate 64. The ram plate 62 is carried by a bracket 66, mounted on a slide 68 which is slidable on a stationary bar 70. A crank shaft 72 is provided for operating the slide 68 by means of a crank 74 and a link 76 having one end journalled on the crank pin and the other end oscillatably connected to the slide 68.

A second shaft 100 at right angles to the shaft 72 is provided with a crank arm 80 similarly connected by a link 82 with a slide 84 which is slidable on a stationary bar 86. A bracket 88 extends from the slide 84 and the fore-and-aft ram plate 64 is connected by a pair of rods 90 to this bracket.

For rotating the shafts 72 and 100, the following described mechanism is provided. A motor shaft 92 extends from a suitable motor (such as one of the electric type as shown in my copending application) into a gear box or speed reducer 94 and a slow speed shaft 99 extends from the gear box through a coupling 96 to drive a shaft 78. The shaft 100 is directly below a shaft 98 (see Figure 1) and is geared to the shaft 98 by gears 102 and 104. The shaft 100, in turn, is driven by a chain 106 extending around a sprocket 108 on the shaft 100, and a sprocket 110 on the shaft 78. The sprocket 112 is merely an idler sprocket and the chain 106 extends on to other parts of the wrapping machine as disclosed in said copending application.

The shaft 38 and thereby the belt 42 is driven by a chain 114 and sprockets 116 and 118 rotatable on the shaft 100 and secured to the shaft 38 respectively. Sprockets 108 and 116 rotate together on the shaft 100. The crank shaft 72 is driven by a spiral gear 120 meshing with a spiral gear 122 on the shaft 100. The shafts 98 and 100 as well as the shaft 72 are journalled in bearings supported by brackets 124 and 126 secured to the extension frame 32.

The chain 106 and the sprocket 116 operate continuously but it is desirable to operate the shafts 100, 98 and 72 only when there are products in the machine to be wrapped. This is accomplished by a clutch arrangement shown particularly in Figure 18 comprising a dog 128 pivoted at 130 to an ear 131 of a hub 132 secured to the shaft 100 by a pin 135. The sprocket 108 has a hub 133 provided with a notch 134 into which the end 136 of the dog 128 is at times adapted to engage under the constraint of a spring 138 seated in the hub 133.

Adjacent the sprocket 108 I provide a stationary tube 140 having a plunger 142 slidable therein and normally biased to its upper limit of movement by a spring 144. When so biased, a cam lobe 146 on the dog 128 engages the plunger as the sprocket 108 rotates clockwise in Figure 18 and causes the dog end 136 to be withdrawn from the notch 134 as illustrated. When the plunger 142 is retracted against the action of the spring 144, the spring 138 rotates the dog clockwise on the pivot 130 for engaging the dog end 136 with the hub 133 of the sprocket 108 so that when the notch 134 thereof reaches a position registering with the dog end, it will drop into the notch and cause rotation of the shaft 100. Such rotation will continue until the plunger 142 is released so as to be raised again by the spring 144.

Means is provided for automatically lowering the plunger 142 whenever two or three pounds of the product 48 are present on the plate 56 and engage a clutch actuating finger 148 shown in Figures 3, 4 and 18. The clutch finger 148 is carried by an arm 150 secured to a rock shaft 152 which is rotatable in suitable bearings 154 and extends transversely of the machine. Referring particularly to Figure 4, the right hand end of the rock shaft 152 has an arm 156 clamped thereto which arm is connected by a link 158 to the plunger 142 as shown in Figure 18. The product has just engaged the finger 148 and it is obvious that further movement toward the right until the product engages a stop plate 160 will rotate the rock shaft 152 for lowering the plunger 142 thus initiating rotation of the shaft 100 and continuing such rotation for one or more revolutions depending upon the supply of product to the belt 42.

The foregoing description substantially parallels the disclosure in my above-mentioned copending application, and I will now describe the mechanism added thereto for feeding flexible wrapping material in a continuous strip from a roll to the machine and for cutting the strip into individual wrappers of specific size depending upon index marks on the wrapping material in accordance with my present invention.

A pair of uprights 162 are provided for supporting a roll of wrapping material 164 by means of plugs 166 as shown in Figures 1 and 2, the plugs being mounted on a shaft 168 freely rotatable in notches 170 of the uprights 162. The shaft 168 has a brake drum 172 secured thereto against which brake shoes 174 are adapted to frictionally engage under the constraint of a spring 176 on a rod 178. The rod is pivoted at 180 to one of the shoes and carries an adjusting nut 182.

Both of the shoes are pivoted at 184 for floating movement and the element 184, as disclosed in Figure 2, is threaded in a boss 186 of one of the uprights 162 and provided with an adjusting knob 188 for the purpose of adjusting the roll of wrapping material 164 laterally of the machine to properly center it with respect to the pockets 58 on the wheel 60.

The wrapping material 164 extends from the roll on the plugs 166 under an idler roller 190 carried by arms 192 pivoted at 194 to side plates 196 supported by brackets 198 and 200. The wrapper then extends up over an idler roller 202, and downwardly under another one, 204, forwardly along a plate 206, and then upwardly under a fourth idler roller 208.

Thereafter the wrapper extends downwardly over an adjustable secondary feed roller 210 shown particularly in Figures 14 and 15. This roller is mounted on a shaft 212, the ends of which are journalled in ball bearings 214 carried by eccentric sleeves 216. The sleeves 216 are rotatable in openings 218 in the side plates 196 and are provided with tubular extensions 220 on which arms 222 are clamped, the arms being connected by a tie rod 224. The tie rod and arms are swung to the position shown by solid lines in Figure 1 for tightening the wrapper 164 between the roller 210 and a main feed roller 226. When swung back to the dotted position of Figure 1, the eccentric sleeves 216 move the center of the shaft 212 away from the center of rotation of the roller 226 for loosening the paper and permitting the threading thereof when a new roll is placed in the machine. Referring to Figure 9, it will be seen that the main feed roller 226 is, in fact, a series of rollers which may be formed of suitable composition for frictionally engaging the wrapper 164, each roller being formed or mounted on a bushing 228 and the bushings being secured to a feed roller shaft 230. The shaft is journalled in a pair of bearings 232 and a bearing 234 mounted in two frame plates 236 and a third frame plate 238. The plates 236 are extensions of the plates 196 and support a tie plate 240 which in turn serves to support the plate 238.

For driving the main feed roller shaft 230, I provide a sprocket 242 on the shaft 98, a chain 244 therearound and a sprocket 246 driven by the chain together with a magnetic clutch which will now be described.

A drive disc 248 (see Figure 9) is secured to the sprocket 246 for rotation therewith and carries a plurality of studs 250 on which planetary pinions 252 are rotatable (see Figure 10). A gear 253 meshes with the planetary pinions and is keyed at 255 to the shaft 230. An internal gear 254 meshes with the planetary pinions 252 and is secured to a clutch armature disc 256. The disc 256 is adapted to rotate on a bearing sleeve 258 on the shaft 230 and this sleeve is rotatable in an electromagnetic core 260. The core has therein a pair of coils 262 and 264 which I term respectively a brake coil and a feed coil. The core itself is floatingly mounted yet restrained against rotation by means of a keyway plate 266 secured thereto as by screws 268 and a stationary key plate 270 provided with a key 272 extending into a keyway 274. There is enough play between the keyway and the key to permit free sliding movement. The key plate is secured to the supporting plate 240 as at 276. An electromagnetic brake is also provided for the feed rollers 226 and this comprises the core 260, the brake coil 262, and a brake armature 278 secured as by a key 280 and a pin 282 to the feed roller shaft 230.

From the construction of the parts just disclosed, it is obvious that when the coils 262 and 264 are de-energized, the sprocket 246 may be rotated without causing rotation of the shaft 230 but when the feed coil 264 is energized, the core 260 will be magnetized to attract the clutch armature disc 256 and thus lock the core and the disc together. Consequently rotation of the sprocket 246 in one direction will cause the planetary pinions 252 to roll along the teeth of the internal gear 254, thus rotating the driven pinion 253 in the same direction and at a higher speed.

When the coil 264 is de-energized and the coil 262 is energized, a braking action will occur because of the brake armature disc 278 being attracted by the core 260 and the rotation of the disc thereby stopped as the core 260 is stationary.

While both coils 262 and 264 are de-energized, as when threading a new supply of wrapper material 164 into the machine, both discs will be free and the rollers 226 may be rotated by hand, a knurled knob 284 being provided for this purpose. The threading operation consists of passing the wrapper under the roller 190, over the roller 202 and under the roller 204 whereupon the plate 206 guides it under the roller 208 and directs it upwardly to go over the roller 210. At that point, the advance end of the wrapper can be manipulated to pass over the roller 210 and between this roller and the feed rollers 226 while the two are spaced apart by swinging the arms 222 to the dotted position of Figure 1. After the wrapper is between the rollers 210 and 226, the arms are swung back to the full line position whereupon the wrapper is clamped between the rollers 210 and 226 for being fed thereby when they are driven by energization of the feed coil 264. The roller 210 is driven in synchronism with the rollers 226 by means of a gear 286 on the feed roller shaft 230 meshing with a gear 288 connected to the shaft 212 for the roller 210 as shown in Figures 9 and 14 respectively.

For automatically controlling the brake coil 262 and the feed coil 264, I provide a suitable control circuit, the fundamentals of which are shown in the Figure 22. A rectifier 290 is provided which may be supplied with A. C. current, the supply wires being indicated as 292 and 294. As illustrated, the rectifier has two direct current outlets, $DC^1$ and $DC^2$. The current from $DC^1$ is of suitable voltage and amperage for supplying current to operate the feed and brake coils 264 and 262. The supply of the current to the coils is controlled by a double-pole, double-throw relay, the switching mechanism of which is indicated generally at 296, and the operating coil at 298.

The current from $DC^2$ is provided for the coil 298 and the automatic mechanism for energizing and de-energizing this coil, the main elements of which are a light source such as an electric bulb 300, a light-sensing element such as a photoelectric tube 302, a thyratron tube 304, a reset switch 306, and a limit switch 308. The reset switch and the limit switch are similar in construction, the limit switch being shown in particular and its description will serve also for the reset switch, the main difference being that a limit cam 310 is provided for the limit switch and a different cam 312 for the reset switch. Both cams have lobes with the advance edges 310ª and 312ª of the lobes substantially coincident as illustrated in Figure 19 and the trailing edges being different as indicated at 310ᵇ and 312ᵇ.

Each switch includes a switch arm 314 for the limit switch and 315 for the reset switch pivoted on a pin 316 which is anchored in a supporting disc 324 formed of insulating material. This disc is clamped to a bearing sleeve 328 for the shaft 72 and the reset and limit cams 310 and 312 are secured to the shaft for rotation therewith by means of a clamp screw 330.

The switch arms 314 and 315 are biased to engage contacts 322 and 325 of the limit and reset switches which are supported on a bracket 332 secured to the disc 324. The arms 314 and 315 are so biased by means of springs 318 around the pivot pin 316 and having one end engaging an arm 314 or 315 as the case may be and the other engaging a bracket 320 of insulating material. Terminal screws 334 are provided for connecting of the springs to circuits, the current flowing from the contacts 322 and 325 through the arms 314 and 315 to the springs. The arms 314 and 315 are also provided with riders 346 and 348 of insulating material which ride on their respective cams and are insulated from the pin 316 by an insulating sleeve 317.

Referring to the diagram in Figure 22, it will be noted the limit switch 308 shunts the plate circuit of the thyratron tube 304 whereas the tube is controlled as to conductivity by a grid circuit supplied with current from an amplifier 336 which in turn is controlled by the photoelectric tube 302. The wrapper 164 passes beneath the bulb 300 and the tube 302 so that light from the bulb indicated at 338 is reflected from the surface of the wrapper as at 340 to the photoelectric tube 302.

As shown in Figure 16, a housing 342 is provided for the bulb 300 and the tube 302 and this housing is mounted on the side plates 196. It is provided with a slot 344 through which the light 338 and its reflection 340 may pass, the photo tube 302 thereby scanning the surface of the wrapper 164. The light may be interrupted by a dark index mark 165 on the wrapper or a dark wrapper with a light index mark can be used. The circuit of the photoelectric tube 302 may be arranged for the current to increase upon either light decrease or light increase in a known manner so that either a light wrapper with a dark mark, or a dark wrapper with a light mark can be scanned by the photo tube and the photo tube thereby render the thyratron tube 304 conducting for automatically controlling the relay coil 298.

According to the present disclosure, the limit switch 308 shunts the plate circuit of the thyratron tube 304 to serve as a holding switch for it, and the reset switch 306 is in series with the plate circuit and/or limit switch. Accordingly, the reset switch, when reclosed after about 90 degrees of rotation of the cam 312 will permit the thyratron tube to energize the coil 298 sufficiently for changing the illustrated position of the relay switch 296 in Figure 22 when the tube is rendered conducting by the photoelectric tube and the amplifier 336 which results in de-energization of the feed coil. The limit switch thereafter closes to serve its purpose as a limit switch which energizes the relay coil 298 in case the thyratron tube is not rendered conducting by operation of the photoelectric tube resulting from no index mark 165 passing below the slot 344 before the limit switch is closed.

Thus the feed coil 264 is normally maintained energized, as the position of the relay switch 296 is up when the coil 298 is de-energized. The relay then energizes the brake coil and de-energizes the feed coil when the relay coil is energized. In actual operation, the cams 310 and 312 are in the position shown in Figure 22 at the end of a completed cycle of the machine as when all the packages of butter or oleomargarine therein have been wrapped and the clutch plunger 142 has been raised by the spring 144 for stopping operation of the product feeding portion of the machine and also the paper feeding mechanism thereof.

The cams 310 and 312 rotate clockwise in Figure 22 so that upon initiation of another cycle of operation by the product 48 engaging the finger 148 and operating the clutch shown in Figure 18, the reset switch will be opened for about one-fourth of a revolution. The thyratron tube is rendered non-conducting right after the beginning of the cycle due to the reset switch opening and thus positive feed under control of the reset switch is assured because this switch is opened immediately upon commencement of rotation of the cam 312 so that the coil 298 is de-energized and the relay is then in the "normal" position which energizes the feed coil.

Positive feed of the wrapper is thereby had beginning with the start of a cycle and when the trailing end 312ᵇ of the reset cam reaches the rider 348 the reset switch 306 is again closed which establishes a circuit to the plate of the thyratron tube which circuit is then completed when the tube is rendered conductive again by operation of the photo tube. At about two-thirds of the revolution of the shaft 72, the limit switch 308 is closed by the trailing end 310ᵇ of the cam 310 reaching the rider 346. Previous to that time, however, the mark 165 passes the slot 344 for decreasing the current flow in the photo tube 302 and causing the amplifier 336 to render the tube 304 conducting so that the plate circuit of the thyratron tube is established and the coil 298 energized as the switch 306 connected in series with the thyratron tube is already closed. Thereupon the feed coil is de-energized and the brake coil energized for immediately stopping the feed of paper with the mark 165 as the slot 344 so that the mark just previous to that one is at the proper position for cut-off of a wrapper from the strip of wrapping material. Thus any time between closure of the reset switch 306 and closure of the limit switch 308, the photo tube can effect energization of the relay coil 298 for stopping the paper feed. If no index mark passes the slot 344, the limit switch will close thus limiting the length of the wrapper to slightly more than the desired length as represented by the two-thirds revolution of the shaft 72. The arrangement disclosed assures accurate stopping of the paper feed with correction occurring for each index mark within the limits between closure of the reset switch and closure of the limit switch.

The coils 262 and 264 are reversely wound so as to produce north and south poles opposed to each other as indicated in Figure 22 and as also indicated in Figure 7 wherein the left half of the figure shows the brake applied when the coil 262 is energized and the coil 264 is de-energized, and the right half shows the clutch applied when the coil 264 is energized and the coil 262 is de-energized. Heavy and light cross-sections have been used in Figure 7 to indicate energized and de-energized conditions respectively of the coils. Heavy dotted lines indicate the main magnetic flux path with N and S indicating north and south poles resulting therefrom. Light dotted lines and $n$ and $s$ indicate secondary flux paths which cause no appreciable effect. It will be noted that the core 260 is energized for a central south pole and a peripheral north pole for the braking action, and reversely for the clutch or feed action, so that any residual magnetism after de-energization of one coil, will be entirely removed by energization of the other one wound to produce opposite polarity. I am thus assured of doing away with all effects of residual magnetism so there is no sluggishness in either the brake action or the feed action, feeding action starting immediately upon energization of the feed coil 264 and braking action starting immediately upon energization of the coil 262.

To further reduce the possibility of residual magnetism making the core 260 adhere to either the brake disc or the feed disc, the surfaces of the discs may be provided with a coating of bronze or the like welded on before machining and a few thousandths of an inch thick, the discs and core of course being formed of ferrous material. As an alternative, the surfaces of the discs may be plated with a suitable non-ferrous material.

After the automatic mechanism just described has stopped the wrapper 164 in the proper position for cutting, the wrapper may be cut in any suitable manner. For this purpose I illustrate a movable knife support 350 on which is slidably mounted a movable knife blade 352. Shearingly coacting therewith is a stationary knife blade 354. The blades are normally spaced from each other as illustrated in Figure 17 with the wrapper 164 between them and the movable blade is adapted to move toward the right in Figure 2 (upwardly in Figure 17) to shear a wrapper from the strip.

For accomplishing movement of the movable knife 352, I provide racks 356 thereon with which pinions 358 mesh as shown in Figure 3. The pinions are mounted on a rock shaft 360 which is journalled in bearings 362 and mounted in the side plates 196. An arm 364 is secured to the rock shaft and connected by a link 366 to a bell crank 368 pivoted at 370 as best shown in Figure 8. The movable knife 352 is normally retained in a retracted position by a spring 372 and this spring holds a roller 374 on the lower end of the bell crank against a cam 376. The cam is mounted on the shaft 100 for one rotation each cycle of the machine and operates the cut off knife during the last third of a revolution of the shaft 72, that is, after the limit switch has been closed to positively stop wrapper feed.

To insure that each wrapper is properly guided before cut-off, I provide guide channels 377 to receive and guide its side edges. A stop 380 at the lower ends of the channels supports the wrapper after cut-off and notches 378 in the channels facilitate ready removal of the wrappers from the channels by the fore-and-aft ram as it pushes a unit of product into a pocket of the rotary conveyor wheel.

I have found that wrapper feeding mechanism of the type disclosed operates reliably to automatically produce cut-off of the wrappers in exact accordance with the index marks 165. In résumé: the reset and limit switch arrangement is such that positive feed action occurs immediately after the start of a cycle as a result of the reset and limit switches opening immediately upon starting of the cycle which deenergizes the relay coil 298 and permits the feed coil to be energized from the source $DC^1$ through the relay switch 296. At the end of a quarter revolution, the reset switch closes for establishing a circuit for the plate side of the thyratron tube 304 whenever it is rendered conductive and it is rendered conductive by the photo electric tube 302 when it responds to an index mark 165. If no mark passes the photoelectric tube before the limit switch recloses, the limit switch will energize the relay coil 298 for operating the brake coil 262 and thereby stopping paper feed prior to cut-off by the knife. In either case, the brake coil then remains energized up to the end of the cycle and beginning in the next cycle before the limit and reset switches are open. When the reset switch does open, the plate circuit of the thyratron tube is broken so that it is no longer in a conducting condition so that it is ready to be rendered conducting by the next photo tube operation in response to an index mark on the wrapper.

Some changes may be made in the construction and arrangements of the parts of my wrapper feeding mechanism without departing from the real spirit and purpose of my invention, and it is my intention to cover by my claims any modified forms of structure or use of mechanical equivalents which may be reasonably included within their scope.

I claim as my invention:

1. In a wrapper feeding mechanism of the character disclosed, a feed roller shaft, a feed roller thereon for engaging a length of wrapper material and propelling the same through a wrapping machine, and means for controlling the feeding of the wrapper comprising a magnetic brake disc secured to said feed roller shaft, a clutch disc rotatable around said feed roller shaft, a driven element geared to said feed roller shaft and said clutch disc, a magnetic core floatingly mounted on said feed roller shaft between said discs and restrained against rotation, a brake coil on said core for magnetizing it to cause it to attract said brake disc for stopping operation of the feed roller, a feed coil on said core for magnetizing it to cause it to attract said clutch disc for effecting operation of the feed roller, mechanical switching means operated by the wrapping machine for effecting energization of said feed coil for starting rotation of said feed roller each cycle of the operation of the wrapping machine, and photo sensitive means for effecting energization of said brake coil and de-energization of the feed coil in response to the passage of a light source illuminated index mark on the wrapper material past the photo sensitive means.

2. In a wrapper feeding mechanism, a feed roller shaft, a feed roller thereon for engaging wrapper material and propelling it through a wrapping machine, and means for controlling the feeding of the wrapper material comprising magnetic clutch and brake discs for said feed roller shaft and rotatable thereon and secured thereto respectively, a non-rotatable magnetic core surrounding said feed roller shaft, located between said discs and having brake and feed coils thereon adapted to attract said brake discs for stopping operation of the feed roller or said clutch disc for effecting operation thereof, a driven element planetarily geared to said feed roller shaft and said clutch disc, a relay energizing said feed coil when the relay is unenergized and energized said brake coil when the relay is energized, a reset switch and the plate circuit of a thyratron tube in series circuit with the coil of said relay, and a photo electric tube for rendering said thyratron tube conducting upon the photoelectric tube responding to an index mark on a wrapper passing by the photoelectric tube, said reset switch being operated to open position by the wrapping machine at the beginning of the cycle of operation thereof to condition said thyratron tube for operation and closed before a light source illuminated index mark registers with said photoelectric tube to energize said relay when said photoelectric tube responds.

3. In a wrapper feeding mechanism of the character disclosed, a feed roller for propelling a length of wrapper material through a wrapping machine, and means for controlling the feeding of the wrapper comprising a magnetic clutch disc rotatable relative to said feed roller, a magnetic brake disc operatively secured to said feed roller, a magnetic core rotatable relative to said feed roller and located between said discs, a driven element, gears rotatably carried thereby and geared to said feed roller and said clutch disc, brake and feed coils on said core to attract said brake disc to said core for stopping operation of the feed roller or said clutch disc to said core for effecting operation thereof, a photoelectric tube for effecting actuation of said brake coil in response to the passage of a light source illuminated index mark on the wrapper past the photoelectric tube, and a relay normally energizing said feed coil and upon operation energizing said brake coil, said relay being operated by said photoelectric tube when it responds to an index mark.

4. In a wrapper feeding mechanism, a feed roll shaft, feed rolls thereon for engaging a length of wrapper material and propelling the same through a wrapping machine, and means for controlling the feeding of the wrapper to a cut-off knife of the machine comprising a magnetic clutch disc rotatable on said feed roll shaft, a magnetic brake disc secured to said feed roll shaft, a driven element geared to said feed roll shaft and to said clutch disc, a magnetic core between said discs and mounted against rotation and adapted to attract said brake disc for stopping operation of the feed roller or said clutch disc for effecting operation thereof, feed and brake coils on said core, said feed coil when energized magnetizing said core with one polarity and said brake coil when energized magnetizing said core with opposite polarity, a relay for controlling the energization of said feed and brake coils, said relay being normally in position for energizing said feed coil, mechanical switching means driven by the wrapping machine for closing the circuit for the coil of said relay, a thyratron tube having its plate circuit in series with said mechanical switching means and said relay coil, and a photoelectric tube responsive to a light source illuminated index mark on the wrapper material as it passes said tube to render said thyratron tube conducting, said mechanical switching means rendering said thyratron tube non-conducting and thereby reconditioning it for another cycle of operation of the wrapping machine.

5. In a wrapper feeding mechanism of the character disclosed, a feed roll shaft, a feed roll thereon for engaging a length of wrapper material and propelling the same through a wrapping machine, and means for controlling the feeding of the wrapper comprising magnetic clutch and brake discs rotatable and fixed respectively relative to said feed roll shaft, a magnetic core mounted between said discs and held against rotation, feed and brake coils thereon adapted to cause said core to attract said brake disc for stopping operation of the feed roll or said clutch discs for effecting operation thereof, a driven element rotatable on said feed roll shaft, planetary pinions carried thereby, an internal gear carried by said clutch disc and meshing with said pinions, a gear on said feed roll shaft also meshing with said pinions, a photoelectric tube for effecting energization of said brake coil, and a mechanical switch responsive to rotation of said driven element for effecting energization of said feed coil.

6. In a wrapper feeding mechanism of the character disclosed, a feed roll shaft, a feed roll thereon for engaging a length of wrapper material and propelling the same through a wrapping machine, and means for controlling the feeding of the wrapper comprising magnetic clutch and brake discs rotatable and fixed respectively relative to said feed roll shaft, a magnetic core mounted between said discs and held against rotation, feed and brake coils thereon adapted to cause said core to attract said brake disc of stopping operation of the feed roll or said clutch disc for effecting operation thereof, a photoelectric tube for effecting energization of said brake coil in response to the passage of a light source illuminated index mark on the wrapper material past the photoelectric tube, a reset switch for effecting energization of said feed coil in response to operation of the wrapping machine, a driven element rotatable on said feed roll shaft, planetary pinions carried thereby, an internal gear carried by said clutch disc and meshing with said pinions, and a gear on said feed roll shaft also meshing with said pinions, said reset switch being responsive to rotation of said driven element.

7. In a wrapper feeding mechanism, a feed roll shaft, a feed roll thereon for propelling a length of wrapper material, and means for controlling the rotation of said shaft comprising a magnetic clutch disc rotatable thereon and a magnetic brake disc fixed thereto, a non-rotatable magnetic core between said discs and brake and feed coils thereon adapted to cause said core to attract said brake disc when said brake coil is energized for stopping rotation of said shaft or attract said clutch disc when said feed coil is energized for effecting rotation of said shaft, a driven element rotatable on said shaft, planetary pinions carried thereby, an internal gear carried by said clutch disc and meshing with said pinions, a gear on said shaft also meshing with said planetary pinions, a photoelectric tube for effecting energization of said brake coil in response to the passage of a light source illuminated index mark on the wrapper material past the photoelectric tube, and a mechanical switch operated by said driven element for energizing said feed coil.

8. In a wrapper feeding mechanism, a feed roll shaft, a feed roll thereon for propelling a length of wrapper material, and means for controlling the rotation of said shaft comprising a magnetic clutch disc rotatable thereon and a magnetic brake disc fixed thereto, a non-rotatable magnetic core between said discs and brake and feed coils thereon adapted to cause said core to attract said brake disc when said brake coil is energized for stopping rotation of said shaft or attract said clutch disc when said feed coil is energized for effecting rotation of said shaft, a driven element rotatable on said shaft, planetary pinions carried thereby, an internal gear carried by said clutch disc and meshing with said pinions, a gear on said shaft also meshing with said planetary pinions, a photoelectric tube for effecting energization of said brake coil in response to the passage of a light source illuminated index mark on the wrapper material past the photoelectric tube, a relay for said coils, a reset switch and a limit switch responsive to rotation of said driven element, a thyratron tube having a plate circuit in series with said reset switch and said relay coil whereby the coil is energized only when the reset switch is closed and the thyratron tube is conducting, a photoelectric tube responsive to index marks on the wrapping material for rendering said thyratron tube conducting each cycle of operation of the machine, said limit switch shunting the plate side of said thyratron tube for energizing said relay at the end of a predetermined limit if the thyratron tube has not done so.

9. Wrapper feeding mechanism comprising a feed roll shaft, feed rolls thereon for engaging a length of wrapper material and propelling the same through a wrapping machine, and means for controlling the feeding of the wrapper material comprising magnetic clutch and brake discs rotatable and fixed respectively relative to said shaft, a magnetic core surrounding said shaft between said discs and mounted against rotation and adapted to attract said brake disc for stopping operation of the feed roller or said clutch disc for effecting operation thereof, brake and feed coils on said core alternately energizable for effecting selective attraction of said discs, a relay for effecting such alternate energization, a driven element rotatable on said shaft, planetary pinions carried thereby, an internal gear carried by said clutch disc and meshing with said pinions, a gear on said feed roll shaft also meshing with said pinions, a reset switch responsive to rotation of said driven element, a thyratron tube having a plate circuit in series with said reset switch and said relay coil whereby the coil is energized only when the reset switch is closed and the thyratron tube is conducting, and a photoelectric tube responsive to light source illuminated index marks on the strip of wrapping material for rendering said thyratron tube conducting each cycle of operation of the machine.

10. Wrapper feeding mechanism comprising a feed roll shaft, feed rolls thereon for engaging a length of wrapper material and propelling the same through a wrapping machine, and means for controlling the feeding of the wrapper material comprising magnetic clutch and brake discs rotatable and fixed respectively relative to said shaft, a magnetic core surrounding said shaft between said discs and mounted against rotation and adapted to attract said brake disc for stopping operation of the feed roller or said clutch disc for effecting operation thereof, brake and feed coils on said core alternately energizable for effecting selective attraction of said discs, a relay for effecting such alternate energization, a driven element rotatable on said shaft, planetary pinions carried thereby, an internal gear carried by said clutch disc and meshing with said pinions, a gear on said feed roll shaft also meshing with said pinions, a reset switch responsive to rotation of said driven element, a thyratron tube having a plate circuit in series with said reset switch and said relay coil, a photoelectric tube responsive to light source illuminated index marks on the strip of wrapping material for rendering said thyratron tube conducting each cycle of operation of the machine, and a limit switch also responsive to rotation of said driven element and shunting said plate circuit for energizing said relay at the end of a predetermined limit in the machine cycle if the thyratron tube has not done so.

THOMAS B. DALTON.

References Cited in the file of this patent

UNITED STATES PATENTS

| Number | Name | Date |
| --- | --- | --- |
| 1,988,486 | Ferenci | Jan. 22, 1935 |
| 1,998,069 | Beutel | Apr. 16, 1935 |
| 2,171,667 | Michelson | Sept. 5, 1939 |
| 2,200,890 | Murray | May 14, 1940 |
| 2,236,631 | Thomas et al. | Apr. 1, 1941 |
| 2,346,194 | Sjostrom | Apr. 11, 1944 |
| 2,427,515 | Swain | Sept. 16, 1947 |